US008954548B2

(12) United States Patent
Glasser

(10) Patent No.: US 8,954,548 B2
(45) Date of Patent: Feb. 10, 2015

(54) TARGETED CACHING TO REDUCE BANDWIDTH CONSUMPTION

(75) Inventor: Alan Glasser, Manalapan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1030 days.

(21) Appl. No.: 12/199,200

(22) Filed: Aug. 27, 2008

(65) Prior Publication Data

US 2010/0057894 A1    Mar. 4, 2010

(51) Int. Cl.
| | |
|---|---|
| *G06F 15/16* | (2006.01) |
| *G06F 15/177* | (2006.01) |
| *H04L 12/28* | (2006.01) |
| *H04L 29/12* | (2006.01) |
| *H04L 29/08* | (2006.01) |

(52) U.S. Cl.
CPC ...... *H04L 61/1511* (2013.01); *H04L 29/12066* (2013.01); *H04L 67/2842* (2013.01); *H04L 67/2885* (2013.01)
USPC ........... 709/222; 709/203; 709/219; 709/230; 709/245; 370/395.54

(58) Field of Classification Search
USPC ....................................................... 709/222
See application file for complete search history.

(56) References Cited

U.S. PATENT DOCUMENTS

| | | | |
|---|---|---|---|
| 5,649,131 A | | 7/1997 | Ackerman et al. |
| 5,822,320 A | | 10/1998 | Horikawa et al. |
| 5,935,207 A | * | 8/1999 | Logue et al. ................. 709/219 |
| 6,236,652 B1 | | 5/2001 | Preston et al. |
| 6,327,252 B1 | | 12/2001 | Silton et al. |
| 6,434,609 B1 | * | 8/2002 | Humphrey .................... 709/218 |
| 6,687,731 B1 | | 2/2004 | Kavak |
| 6,883,068 B2 | * | 4/2005 | Tsirigotis et al. ............. 711/133 |
| 6,920,129 B2 | | 7/2005 | Preston et al. |
| 7,133,905 B2 | | 11/2006 | Dilley et al. |
| 7,254,138 B2 | | 8/2007 | Sandstrom |
| 7,328,009 B2 | | 2/2008 | Takeda et al. |
| 7,330,906 B2 | | 2/2008 | Hameleers et al. |
| 7,343,422 B2 | | 3/2008 | Garcia-Luna-Aceves et al. |
| 7,565,450 B2 | * | 7/2009 | Garcia-Luna-Aceves et al. ............................. 709/245 |
| 2002/0078233 A1 | * | 6/2002 | Biliris et al. .................. 709/238 |
| 2002/0129116 A1 | * | 9/2002 | Humphrey .................... 709/217 |
| 2003/0051016 A1 | | 3/2003 | Miyoshi et al. |
| 2003/0079027 A1 | | 4/2003 | Slocombe et al. |
| 2003/0115420 A1 | * | 6/2003 | Tsirigotis et al. ............. 711/133 |
| 2003/0182410 A1 | | 9/2003 | Balan et al. |
| 2003/0193958 A1 | | 10/2003 | Narayanan |

(Continued)

OTHER PUBLICATIONS

"Border Gateway Protocol," Wikipedia Encyclopedia, Jul. 17, 2008, http://en.wikipedia.org/wiki/Border_Gateway_Protocol.

*Primary Examiner* — Ranodhi Serrao
*Assistant Examiner* — Farrukh Hussain
(74) *Attorney, Agent, or Firm* — Akerman LLP; Michael K. Dixon; Roy P. Zachariah

(57) ABSTRACT

A system includes a name server, an edge cache server, and a local cache server. The name server is configured to provide an anycast IP address in response to a request for an IP address of an origin hostname from a client system. The edge cache server is configured to respond to the anycast IP address and a unicast IP address and to retrieve content from an origin. The local cache server includes a storage and is configured to respond to the anycast IP address, to retrieve content from the edge cache server, and provide the content to a client system.

21 Claims, 4 Drawing Sheets

(56) References Cited

U.S. PATENT DOCUMENTS

| | | |
|---|---|---|
| 2004/0107234 A1 | 6/2004 | Rajahalme |
| 2004/0111443 A1* | 6/2004 | Wong et al. .................. 707/202 |
| 2004/0143662 A1 | 7/2004 | Poyhonen et al. |
| 2004/0146045 A1 | 7/2004 | Jimmei et al. |
| 2004/0165565 A1 | 8/2004 | Omae et al. |
| 2005/0164729 A1 | 7/2005 | Narayanan et al. |
| 2005/0198367 A1 | 9/2005 | Ettikan |
| 2006/0018299 A1 | 1/2006 | Yamamoto |
| 2006/0018317 A1 | 1/2006 | Jimmei |
| 2006/0020660 A1 | 1/2006 | Prasad et al. |
| 2006/0136485 A1* | 6/2006 | Yared et al. .................. 707/102 |
| 2006/0193252 A1 | 8/2006 | Naseh et al. |
| 2006/0209885 A1 | 9/2006 | Hain et al. |
| 2006/0221866 A1 | 10/2006 | Shepherd |
| 2006/0236394 A1 | 10/2006 | Morrow et al. |
| 2006/0271705 A1* | 11/2006 | Garcia-Luna-Aceves .... 709/242 |
| 2007/0050522 A1 | 3/2007 | Grove et al. |
| 2007/0088708 A1 | 4/2007 | R. |
| 2007/0133539 A1 | 6/2007 | Kang et al. |
| 2007/0243821 A1 | 10/2007 | Hundscheidt et al. |
| 2008/0080513 A1 | 4/2008 | Kang et al. |
| 2008/0123640 A1 | 5/2008 | Bhatia et al. |
| 2008/0126529 A1 | 5/2008 | Kim et al. |
| 2008/0235400 A1* | 9/2008 | Slocombe et al. ............. 709/245 |
| 2008/0279222 A1* | 11/2008 | Fuller et al. .................. 370/501 |
| 2009/0113057 A1* | 4/2009 | Van der Merwe et al. .... 709/227 |
| 2009/0248886 A1* | 10/2009 | Tan et al. ...................... 709/231 |

* cited by examiner

US 8,954,548 B2

TARGETED CACHING TO REDUCE BANDWIDTH CONSUMPTION

FIELD OF THE DISCLOSURE

The present disclosure generally relates to communications networks, and more particularly relates to targeted caching to reduce bandwidth consumption.

BACKGROUND

Packet-switched networks, such as networks based on the TCP/IP protocol suite, can distribute a rich array of digital content to a variety of client applications. One popular application is a personal computer browser for retrieving documents written in the Hypertext Markup Language (HTML) over the Internet via the Hypertext Transfer Protocol (HTTP). Frequently, these documents include embedded content. Where once the digital content consisted primarily of text and static images, digital content has grown to include audio and video content as well as dynamic content customized for an individual user. Similarly, software updates can be distributed through the network via HTTP.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
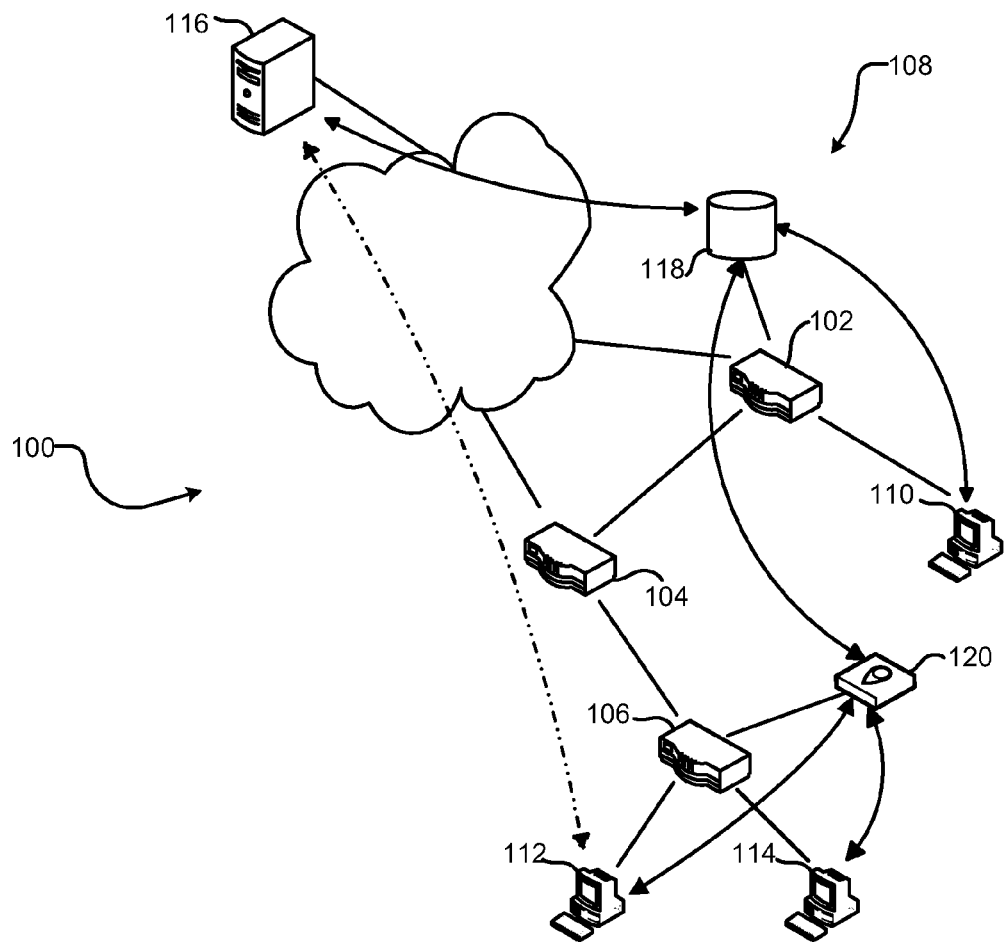
FIG. 1 is a diagram illustrating a content distribution network (CDN) in accordance with one embodiment of the present disclosure.

FIG. 1 shows a geographically disperse network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, and 114 connected to respective routers 102 and 106 to access the network 100. Router 102 can provide ingress and egress for client system 110. Router 106 can provide ingress and egress for both of client systems 112 and 114.

Client systems 110, 112, and 114 can retrieve information from an origin server 116. For example, client system 112 can retrieve content, such as videos, music, portable document format files, and software updates or patches, provided by origin server 116. Alternatively, the content may be a data file for a distributed computing project. Client systems 110, 112, and 114 can retrieve the data file from the origin server 116, process a portion of the data file, and return a result file to either origin server 116 or another server. The results file for the client systems 110, 112, and 114 can be combined with result files from additional client systems to obtain a result for the data file.

The time normally required for client system 112 to retrieve the information from the origin server 116 is related to the size of the file, the distance the information travels, and available bandwidth along the route. Additionally, the load on the origin server 116 is related to the number of client systems 110, 112, and 114 that are actively retrieving information from the origin server 116. As such, the resources such as processor, memory, and bandwidth available to the origin server 116 limit the number of client systems 110, 112, and 114 that can simultaneously retrieve information from the origin server 116.

Additionally, the network can include an edge cache server 118 and a local cache server 120 replicating content from the origin server 116 that can be located more closely within the network to the client systems 110, 112, and 114. Edge cache server 118 can connect to router 102, and local cache server 120 can connect to router 106. Client systems 110, 112, and 114 can retrieve content from edge cache server 118 or local cache server 120 to decrease the time required for delivery of the content. When the content is a data file for a distributed computing project, the client systems 110, 112, and 114 may return the result files to the origin server 116, the edge cache server 118, the local cache server 120, or any combination thereof. In an embodiment, the network 100 may contain a plurality of local cache servers and/or a plurality of edge cache servers geographically distributed to reduce latency to additional client systems.

In an embodiment, edge cache server 118 and local cache server 120 can both respond to an anycast address. Generally, an anycast address is an Internet Protocol (IP) address that identifies two or more receivers, but only one of them is chosen at any given time to receive information from any given sender. Routing protocols utilized by network 100 can direct traffic along a shortest path between the sender and the receiver. In the case of an anycast address, each router in the network can send packets addressed to the anycast address towards the closest system announcing the anycast address. For example, router 102 can direct packets addressed to the anycast address to edge cache server 118, router 106 can direct packets addressed to the anycast address to the local cache server 120. From the router 104, packets addressed to the anycast address must pass to either router 102 or router 106. In an embodiment where the network distance from router 104 to router 102 is substantially similar to the network distance from router 104 to router 106, network policies can be used to determine a preferred route. Packets addressed to the anycast address from client system 110 can first reach router 102 and be directed to edge cache server 118. Packets addressed to the anycast address from client systems 112 and 114 can first reach router 106 and can be directed to local cache server 120.

In an embodiment, the network can utilize a routing protocol, such as border gateway protocol (BGP), to determine routes through the network. A router can receive network layer reachability information (NLRI) from peer devices. Based on the NLRI, the router can determine a best next hop for network traffic destined for an IP address. The best next hop can be the peer device with a shortest network distance to the destination IP address. The local cache server 120 and the edge cache server 118 can participate in a BGP group, providing NLRI information indicating that the local cache server is a preferred destination for packets addressed to the anycast address. Peer routers can determine a preferred route for packets addressed to the anycast address based on network policies and their distance to the local cache server and to the edge cache server.

Client system 112 may send a request for content to local cache server 120. If local cache server 120 has the information stored in a cache, it can provide the content to client system 112. This can decrease the distance the information travels and reduce the time to retrieve the information. Alternatively, when local cache server 120 does not have the content, it can retrieve the content from edge cache server 118 prior to providing the content to the client system 112. In an alternate embodiment, the local cache server 120 may retrieve the content from another local cache server 120 within the network.

Edge cache server 118 may either provide cached content to local cache server 120 or retrieve the content from the origin server 116 prior to providing the content to local cache server 120. In another alternate embodiment, the edge cache server 118 may retrieve the content from another server replicating the content stored on the origin server 116, such as another edge cache server 118.

Edge cache server 118 and local cache server 120 can cache the content in order to respond to additional requests for the content without first retrieving the content from another server. In this way, the content may be retrieved from the origin server 116 only once, reducing the load on origin server 116 and network 100 such as, for example, when client systems 114 and 110 request the same content.

Figure 2:
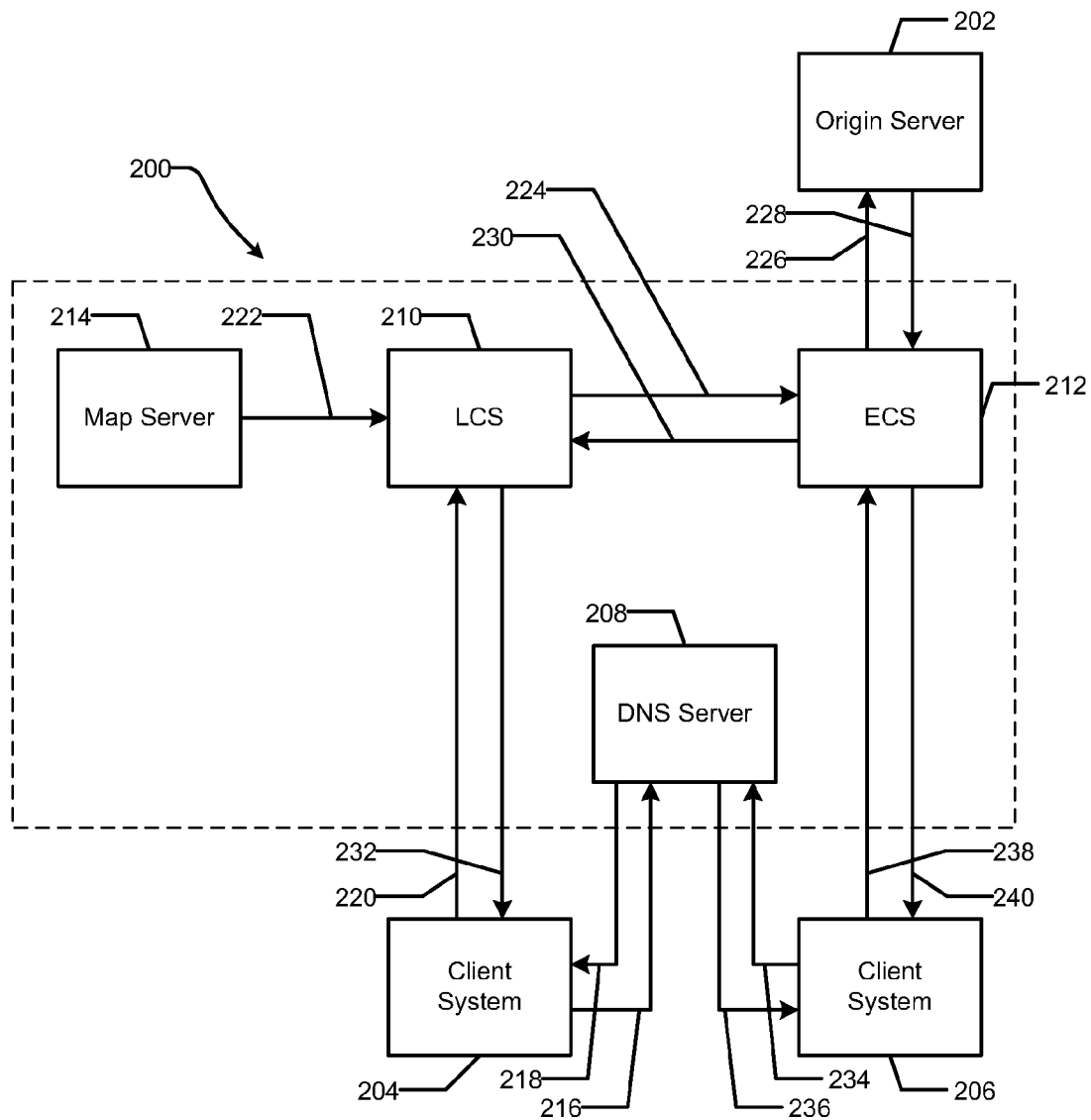
FIG. 2 is block diagram illustrating a system for distributing content to client systems in accordance with one embodiment of the present disclosure.

FIG. 2 shows a block diagram illustrating an exemplary system 200 for distributing content from an origin server 202 to client systems 204 and 206. The system 200 can include a Domain Name System (DNS) server 208, a local cache server 210, an edge cache server 212, and a map server 214. The local cache server 210 can be a diskless cache server. For example, the local cache server 210 may have a non-volatile memory, such as a flash memory for storing an operating system and settings, and a substantial amount of volatile memory such as RAM for caching content files. In an embodiment, the local cache server 210 may lose the content files from the volatile memory during a loss of power or a restart. Alternatively, the local cache server 210 may utilize the non-volatile memory for storing content files during a powered down state.

In an embodiment, client system 204 can send a request 216 to the DNS server 208. The request 216 can include a hostname of the origin server 202. The DNS server 208 can send a response 218 including an anycast address. The anycast address can be an IP address shared by the local cache server 210 and the edge cache server 212. Client system 204 can send a request 220 for the content using the anycast address. In an embodiment, the content can be a relatively popular content, such as a Microsoft Windows update, that can be requested by a significant number of clients within a relatively short period of time. When the network distance from client system 204 to local cache server 210 is less than the network distance from client system 204 to edge cache server 212, the local cache server 210 can receive the request 220. In an embodiment, the local cache server 210 may periodically receive an instruction 222 from the map server 214. The instruction 222 can include a map server table. The map server table can include the anycast IP address and a unicast IP address for the edge cache server 212 associated with the anycast IP address. For example, the map server 214 can periodically push the map server table to the local cache server 210. Alternatively, the local cache server 210 can periodically request the map server table from the map server 214. In a further embodiment, the local cache server 210 may not announce a route for the anycast address until is receives the map server table.

When the local cache server 210 does not have the content, the local cache server can send a request 224 to edge cache server 212 for the content. When edge cache server 212 does not have the content, edge cache server 212 may send a request 226 to the origin server 202. The origin server 202 can send a response 228 including the content to the edge cache server 212. The edge cache server 212 can store the content and send a response 230 including the content to the local cache server 210. Similarly, the local cache server 210 can store the content and send a response 232 including the content to the client system 204.

In another embodiment, client system 206 can send a request 234 to the DNS server 208. The request can include the hostname of the origin server 202. The DNS server 208 can send a response 234 including the anycast address. Client system 206 can send a request 238 for the content using the anycast address. When the network distance from client system 204 to local cache server 210 is greater than the network distance from client system 204 to the edge cache server 212, the edge cache server 212 can receive the request 238. When the edge cache server 212 has the content, the edge cache server 212 can send a response 240 including the content to the client system 206.

Figure 3:
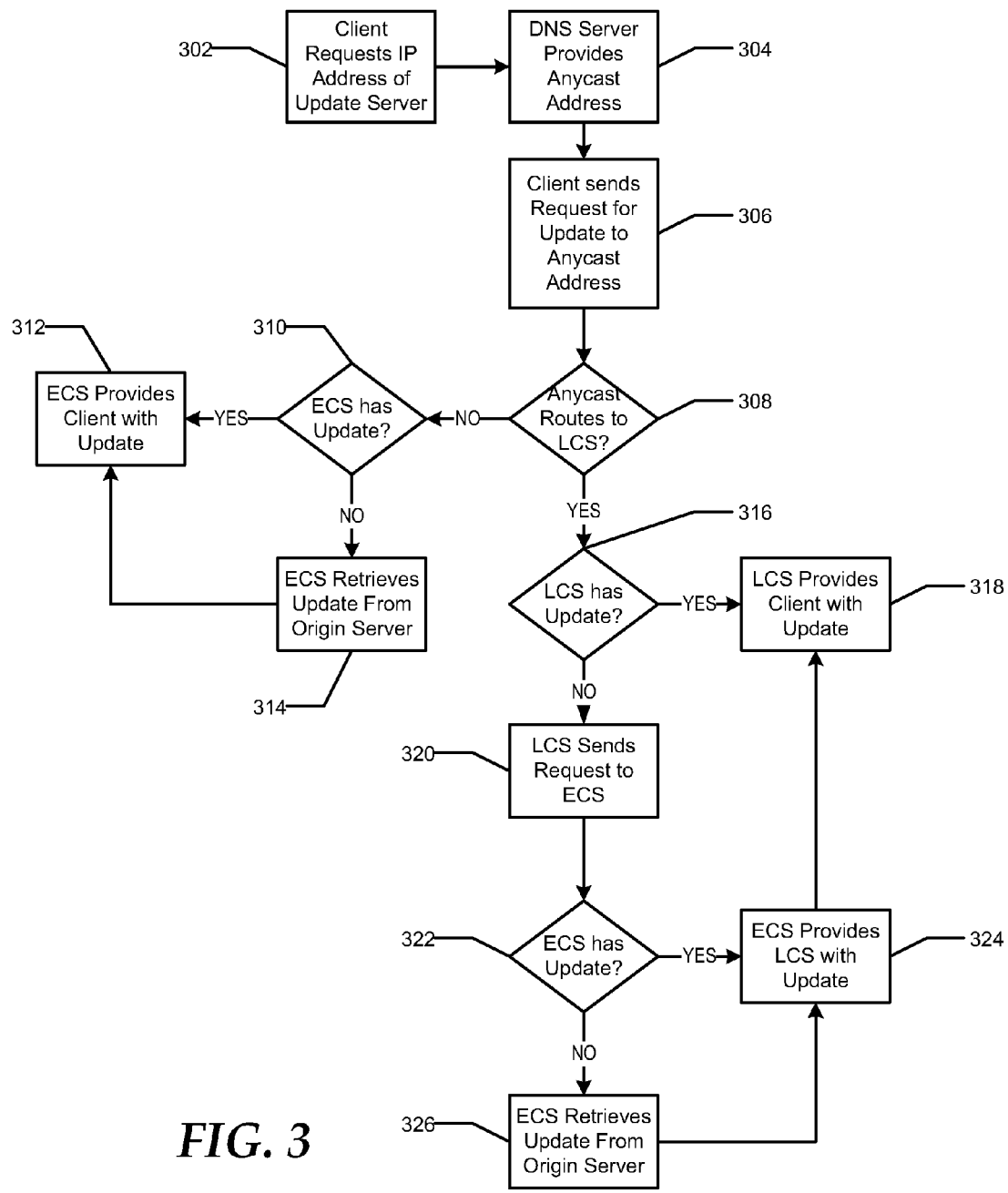
FIG. 3 is a flow diagram illustrating a method of distributing content to client systems in accordance with one embodiment of the present disclosure.

FIG. 3 shows a flow diagram illustrating an exemplary method for providing client systems with content. At 302, the client system can request an IP address of an origin server. The request can include a hostname of an origin server. At 304, the DNS server can provide an anycast address. The anycast address can be an IP address shared by a local cache server and an edge cache server. At 306, the client system can send a request for the content to the anycast address. At 308, the network can determine if the request is routed to the local cache server. When network distance from the client system to the edge cache server is less than the network distance from the client system to the local cache server, the request can be routed to the edge cache server rather than to the local cache server. At 310, the edge cache server can determine if the content is cached or if the content must be retrieved from the origin server. When the content is cached at the edge cache server, the edge cache server can provide the content to the client, as illustrated at 312. Alternatively, when the content is not cached at the edge cache server, the edge cache server can retrieve the content from the origin server, as illustrated at 314, prior to providing the content to the client, as illustrated at 312.

Alternatively, when the network distance from the client system to the edge cache server is greater than the network distance from the client system to the local cache server, the request can be routed to the local cache server rather than the edge cache server. At 316, the local cache server can determine if the content is cached. When the content is cached at the local cache server, the local cache server can provide the content to the client, as illustrated at 318.

Alternatively, when the content is not cached at the local cache server, the local cache server can request the content from the edge cache server, as illustrated at 320. At 322, the edge cache server can determine if the content is cached or if the content must be retrieved from the origin server. When the content is cached at the edge cache server, the edge cache server can provide the content to the local cache server, as illustrated at 324, and the local cache server can provide the content to the client, as illustrated at 318. Alternatively, when the content is not cached at the edge cache server, the edge cache server can retrieve the content from the origin server, as illustrated at 326, and can provide the content to the local cache server, as illustrated at 324.

Figure 4:
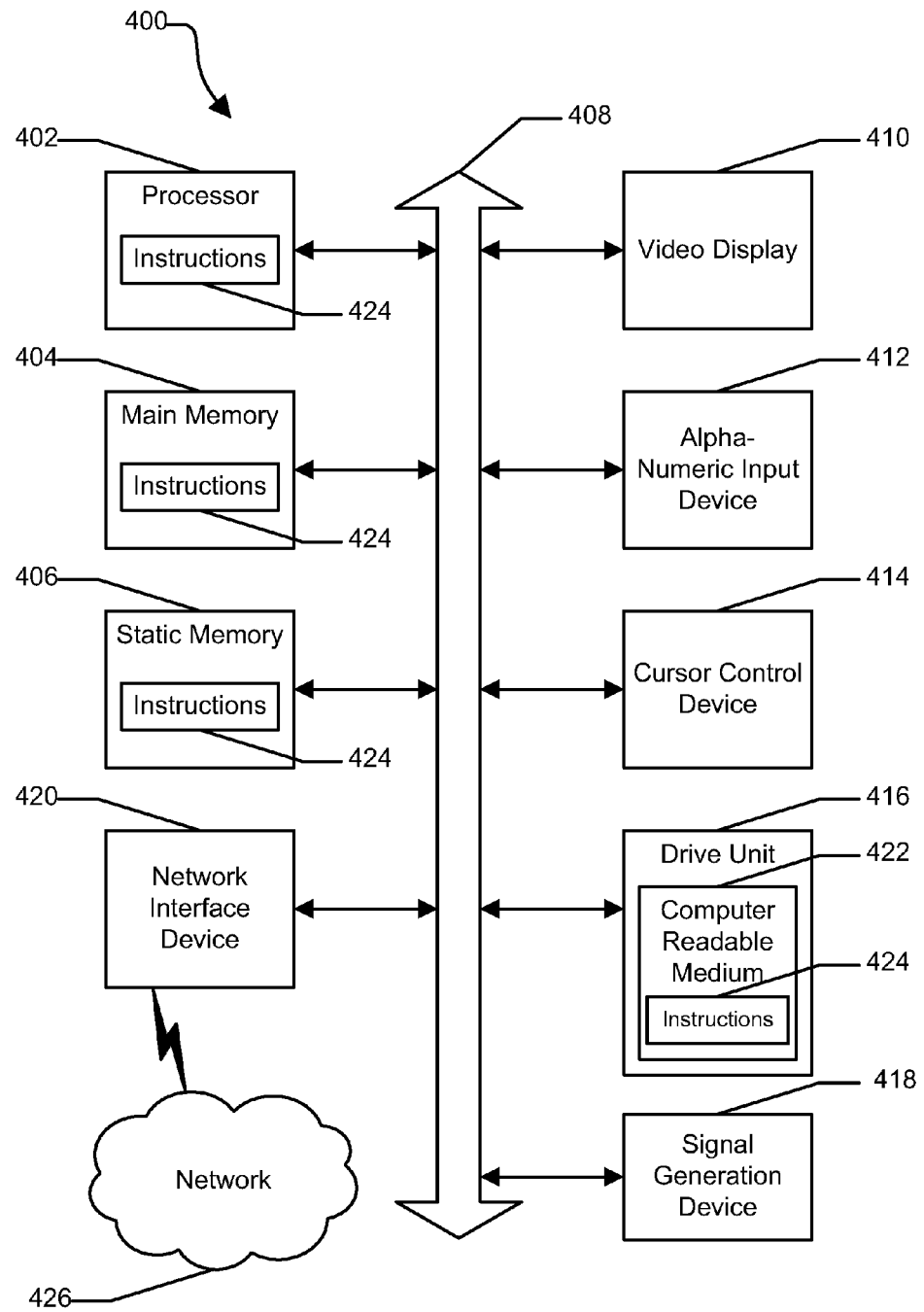
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid-state display, or a cathode ray tube (CRT). Additionally, the computer system 400 may include an input device 412 such as a keyboard, and a cursor control device 414 such as a mouse. Alternatively, input device 412 and cursor control device 414 can be combined in a touchpad or touch sensitive screen. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
a name server that provides an anycast internet protocol address in response to a request for an internet protocol address of an origin hostname from a client system;
an edge cache server that responds to the anycast internet protocol address and to a unicast internet protocol address of the edge cache server, retrieves content from an origin server, provides the content to the client system in response to a request sent from the client system to the anycast address, and provides the content to a local cache server in response to a request from the local cache server sent to the unicast address of the edge cache server; and the local cache server including a storage, wherein the local cache server responds to the anycast internet protocol address, retrieves the content from the edge cache server by sending the request to the unicast address of the edge cache server, and provides the content to the client system in response to the request sent from the client system to the anycast address, wherein the request from the client system to the anycast address is routed to the edge cache server and the local cache server, wherein a table from a map server is received, wherein the local cache server periodically requests the table from the map server, wherein the local cache server announces a route for the anycast internet protocol address in response to receiving the table from the map server, wherein the table converts the anycast internet protocol address to the unicast internet protocol address of the edge cache server, wherein the edge cache server announces a route for the anycast internet protocol address, wherein the route announced by the edge cache server directs requests to the edge cache server.

2. The system of claim 1 wherein the storage is a diskless storage.

3. The system of claim 1 wherein the route announced by the local cache server directs a portion of the requests to the local cache server.

4. The system of claim 1 wherein the local cache server announces the route using border gateway protocol.

5. The system of claim 1 wherein the local cache server participates in a border gateway protocol group with the edge cache server.

6. The system of claim 1 wherein the edge cache server announces the route using border gateway protocol.

7. The system of claim 1 wherein the table includes the anycast internet protocol address and the unicast internet protocol address of the edge cache server.

8. The system of claim 1 wherein the map server pushes the table to the local cache server.

9. A method comprising:

receiving a request for content from a client system, the request addressed to an anycast internet protocol address, wherein the anycast internet protocol address is provided by a name server in response to a request for an internet protocol address of an origin hostname from the client system;

responding to the anycast internet protocol address and to a unicast internet protocol address of an edge cache server by utilizing the edge cache server, wherein the edge cache server retrieves the content from an origin server, provides the content to the client system in response to the request addressed to the anycast internet protocol address, and provides the content to a local cache server in response to a request from the local cache server sent to the unicast internet protocol address of the edge cache server;

responding to the anycast internet protocol address by utilizing the local cache server, wherein the local cache server retrieves the content from the edge cache server by sending the request to the unicast internet protocol address of the edge cache server, and provides the content to the client system in response to the request addressed to the anycast internet protocol address; and routing the request from the client system to the anycast internet protocol address to the edge cache server and the local cache server, wherein a table from a map server is received, wherein the local cache server periodically requests the table from the map server, wherein the local cache server announces a route for the anycast internet protocol address in response to receiving the table from the map server, wherein the table converts the anycast internet protocol address to the unicast internet protocol address of the edge cache server, wherein the edge cache server announces a route for the anycast internet protocol address, wherein the route announced by the edge cache server directs requests to the edge cache server.

10. The method of claim 9 wherein a storage of the local cache server is a diskless storage.

11. The method of claim 9 further comprising storing the content in the local cache server and providing the content to a second client system.

12. The method of claim 9 wherein the local cache server participates in a border gateway protocol group with the edge cache server.

13. The method of claim 9 wherein the announcing is accomplished using border gateway protocol.

14. The method of claim 9 further comprising determining the unicast internet protocol address, wherein the determining of the unicast internet protocol address includes accessing the table based on a request sent to the map server.

15. The method of claim 14 further comprising receiving the table from the map server.

16. A device comprising:

a local cache server that stores content, wherein a storage of the local cache is a volatile memory; and a processor in communication with the local cache server, wherein the processor executes instructions to perform operations comprising:

receiving a request for content from a client system, the request addressed to an anycast internet protocol address, wherein the anycast internet protocol address is provided by a name server in response to a request for an internet protocol address of an origin hostname from the client system, wherein an edge cache server responds to the anycast internet protocol address and to a unicast internet protocol address of the edge cache server, retrieves the content from an origin server, provides the content to the client system in response to the request addressed to the anycast internet protocol address, and provides the content to the local cache server in response to a request from the local cache server sent to the unicast internet protocol address of the edge cache server;

responding to the anycast internet protocol address by utilizing the local cache server, wherein the local cache server retrieves the content from the edge cache server by sending the request to the unicast internet protocol address of the edge cache server, and provides the content to the client system in response to the request addressed to the anycast internet protocol address; and routing the request from the client system to the anycast internet protocol address to the edge cache server and the local cache server, wherein a table from a map server is received, wherein the local cache server periodically requests the table from the map server, wherein the local cache server announces a route for the anycast internet protocol address in response to receiving the table from the map server, wherein the table converts the anycast internet protocol address to the unicast internet protocol address of the edge cache server, wherein the edge cache server announces a route for the anycast internet protocol address, wherein the route announced by the edge cache server directs requests to the edge cache server.

17. The device of claim 16 wherein the storage is a diskless storage.

18. The device of claim 16 wherein the operations further comprise providing the content to a second client system.

19. The device of claim 16 wherein the local cache server participates in a border gateway protocol group with the edge cache server.

20. The device of claim 16 wherein the operations further comprise announcing the route using border gateway protocol.

21. The device of claim 16 wherein the operations further comprise routing the request for content from the client system to the edge cache server if the edge cache server has a shorter network distance to the client system than the local cache server.

* * * * *